Nov. 24, 1953 W. A. WING 2,660,226
SEAT BACK REST SUPPORT
Filed June 13, 1951
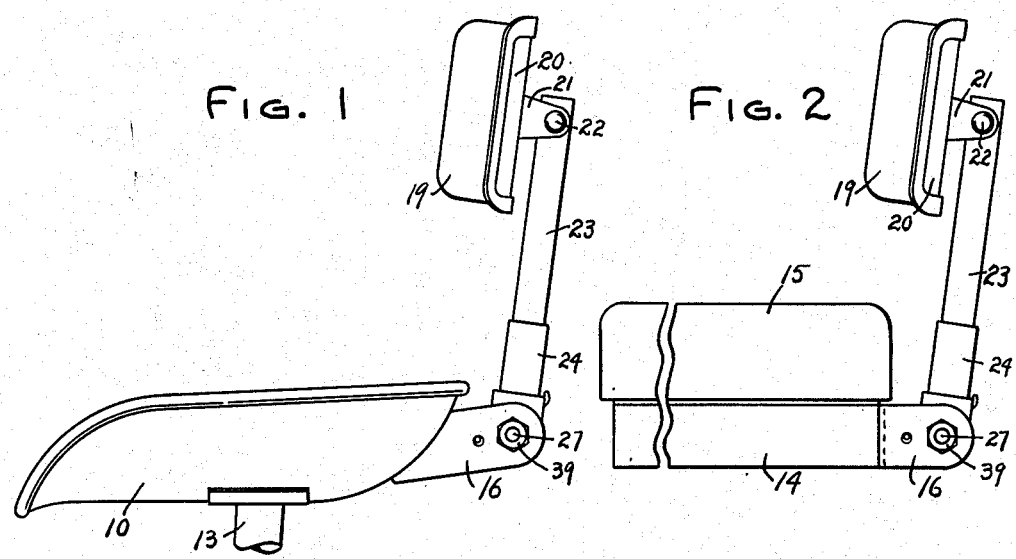
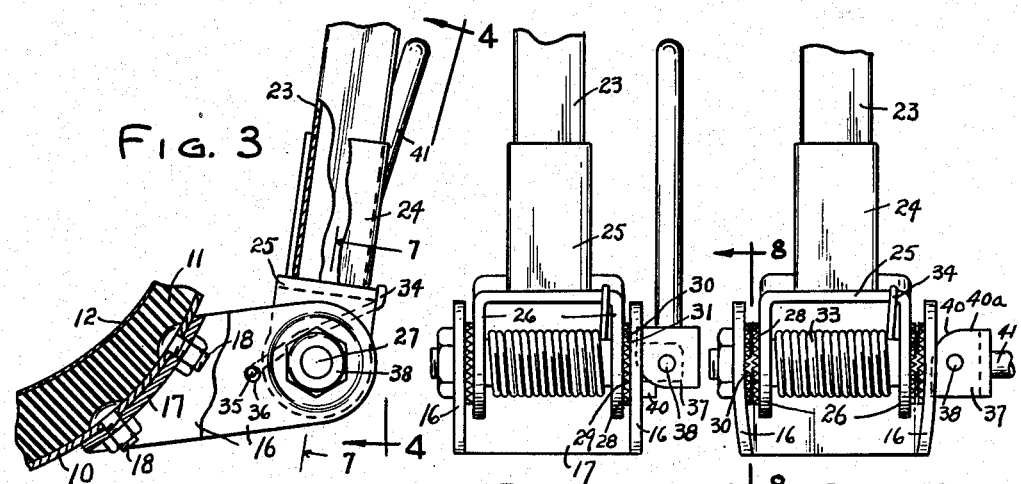
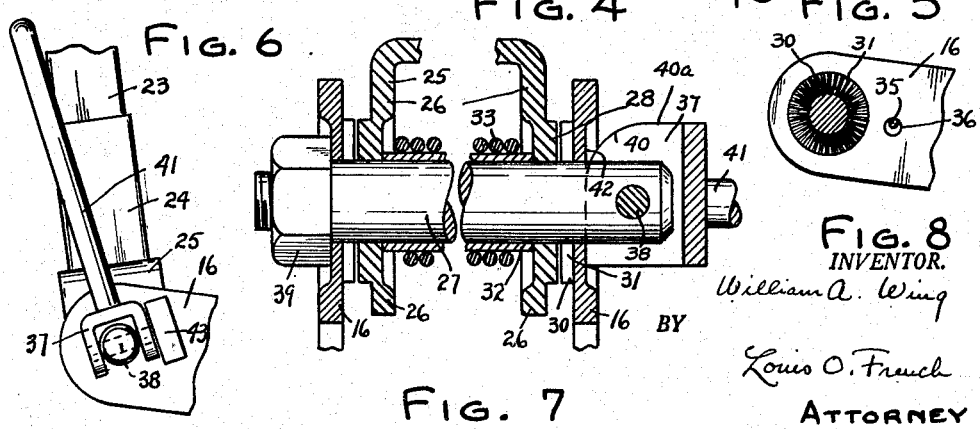
INVENTOR.
William A. Wing
BY Louis O. French
ATTORNEY Patented Nov. 24, 1953

2,660,226

UNITED STATES PATENT OFFICE 2,660,226

SEAT BACK REST SUPPORT

William A. Wing, Milwaukee, Wis., assignor to Milsco Manufacturing Company, Milwaukee, Wis., a corporation of Wisconsin Application June 13, 1951, Serial No. 231,299

2 Claims. (Cl. 155—160)

The invention relates to seats and more particularly to an adjustable back rest.

The main object of the invention is to provide a backrest support mounted for angular adjustment relative to the seat by a hinge connection with the seat frame, which connection includes a pair of radially toothed jaw clutches whose clutch elements are angularly adjustable relative to each other and adapted to be clutched together by an operator controlled clamping means in the desired angular position of the backrest relative to the seat. The invention is of particular utility on tractor seats and on seats for gunners in tanks.

The invention further consists in the several features hereinafter described and more particularly defined by claims at the conclusion hereof.

In the drawings:

Fig. 1 is an elevation view of a seat structure provided with the invention;

Fig. 2 is a view similar to Fig. 1 showing a different form of seat;

Fig. 3 is an enlarged elevation view of parts of the seat structure shown in Fig. 1, parts being broken away and parts being shown in section;

Fig. 4 is a rear elevation view looking along the line 4—4 of Fig. 3;

Fig. 5 is a view similar to Fig. 4 with the adjustable hinge in a released position;

Fig. 6 is a detailed side elevation view of the side of the hinge connection between the backrest support and the seat opposite to that shown in Fig. 1;

Fig. 7 is a detailed sectional view taken on the line 7—7 of Fig. 3;

Fig. 8 is a detailed side elevation view of one of the fixed clutch elements.

The seat with which the backrest support embodying the invention may be used may be of any suitable construction. In Fig. 1 I have shown a bucket type seat including a metal seat body 10 provided with a cushion 11 of sponge rubber or other suitable material having a top covering 12 secured thereto, said body forming the seat frame and usually mounted on a suitable upright 13. In Fig. 2 I have shown a seat embodying a metal frame 14 and a seat cushion 15 mounted on this frame. In each instance spaced arms 16 are formed as part of a U-shaped bracket 17 which is secured to the seat body or frame by bolts 18 or by welding or brazing or in any other suitable manner.

In each instance, a backrest cushion 19 is mounted on a metal base member 20 having a U-shaped bracket 21 (one side being shown) integrally secured or connected thereto, whose arms are pivotally connected by a bolt 22 to the upper end of a supporting upright which includes a square metal tube 23 which fits at its lower end in a square socket 24 formed as a part of a hinge member 25 provided with spaced hinge arms 26 that are disposed between the arms 16 of the seat carried bracket 17. A pivot bolt 27 passes through alined apertures in the arms 16 and 26 so that the backrest support or upright may swing or tilt angularly relative to the seat.

The invention herein relates to the hinge connection between the backrest support and the seat whereby the backrest support may be tilted to different angular positions relative to the seat and be secured in the desired position.

Referring to Figs. 4 to 8, each of the hinge arms 26 has an angularly adjustable clutch lock connection with the adjacent arm 16. For this purpose each arm 26 has a clutch member 28 formed by a series of clutch teeth 29 radially extending from the hinge pin opening of said arm. These teeth 29 are formed by displacing a portion of the metal of the arm 26 laterally into a die cavity by hydraulic pressure while the metal is annealed and then hardening the metal. Similarly, each arm 16 has a cooperative clutch member 30 formed by a series of clutch teeth 31 radially extending from the hinge pin opening of said arm and formed in the same way by a pressing operation and a hardening operation. Fig. 8 shows a front view of one of the clutch members. The others are similar. When the clutch members 28 and 30 are engaged, the teeth of these elements intermesh with each other to form a strong clutch lock between the arms 26 and 16.

The clutch members 28 are held in a laterally fixed position by a metal sleeve 32 surrounding the pivot bolt 27 and abutting the arms 26. A coiled torsion spring 33 surrounding the sleeve 32 has one end 34 engaging the member 25 and its other end 35 disposed in a hole 36 in one of the arms 16 so as to normally urge or swing the backrest support forwardly toward the seat.

For locking the cooperative clutch members 28 and 30 together, means are provided for springing or moving the arms 16 of the bracket 17 inwardly or toward each other so as to bring the clutch parts into intermeshing relation. For this purpose, a cam member 37 is pivotally connected by a pin 38 to one end of the hinge bolt 27 adjacent one of the arms 16 while the head 39 of said bolt is disposed adjacent the other arm 16. The cam member 37, here shown as a forked member whose bifurcations are provided with cam surfaces 40, has an operating handle 41 connected thereto to form a camming lever whose surfaces 40 are moved into contact with the outer face 42 of one of the arms 16 when said lever is swung upwardly to a clutch locking position, as shown in Fig. 4, this movement causing an inward lateral movement of the arms 16 due to the abutting engagement of the head 39 of the bolt and the surfaces 40 with said arms 16, so that said arms 16 with their clutches 30 are drawn toward each other and into locking engagement with the cooperative relatively fixed clutch members 28 on the backrest support. On the downward swinging movement of the cam lever to the position shown in Figs. 5 and 7 the natural resiliency of the metal forming the arms 16 causes them to spring apart to release the clutch elements so that the occupant of the seat may swing the backrest support backwardly against the action of the spring 33 to the desired angular position of the backrest and then lock the backrest support in this position by swinging the cam lever upwardly to the position shown in Fig. 4. This adjustment may be made while the operator is in his seat.

To prevent free turning of the cam member with the pivot bolt 27, a stop lug 43 is formed as a part of one of the arms 16 and disposed at one side of the cam member 37. In the final locked position of the hinge parts the high flat side 40a of the cam surfaces 40 abuts the outer face 42 of one of the arms 16, thus limiting the final squeeze between the parts.

I desire it to be understood that this invention is not to be limited to any particular form or arrangement of parts except in so far as such limitations are included in the appended claims.

What I claim as my invention is:

1. In a seat structure having a backrest support hingedly connected to the seat for tiltable adjustment relative thereto, the hinge connection comprising the combination of resilient spaced arms secured to the seat, spaced arms on the backrest support disposed between the first named arms, a pivot member extending through both sets of arms, a clutch connection between adjacently disposed arms comprising intermeshing teeth integral with said arms, and means for inwardly flexing the seat arms relative to the arms on the backrest support to bring the teeth on said arms into clutching engagement with each other.

2. In a seat structure having a backrest support hingedly connected to the seat for tiltable adjustment relative thereto, the hinge connection comprising the combination of resilient spaced arms secured to the seat, spaced arms on the backrest support, a pivot bolt extending through both sets of arms and having a head engaging one of said seat arms, a clutch connection between adjacently disposed arms comprising intermeshing clutch teeth radially disposed relative to said pivot member and integral with said arms, and means for bringing said clutch teeth of each clutch connection into intermeshing locked connection comprising said pivot bolt and a cam member pivotally connected with said bolt and engageable with the other of said seat arms to flex said seat arms toward the other set of arms, said cam member having a flat surface engageable with said other seat arm to limit the final squeeze between said seat arms and the spaced arms of said backrest support.

WILLIAM A. WING.

References Cited in the file of this patent

UNITED STATES PATENTS

| Number | Name | Date |
| --- | --- | --- |
| 1,044,530 | Hunn | Nov. 19, 1912 |

FOREIGN PATENTS

| Number | Country | Date |
| --- | --- | --- |
| 562,011 | Great Britain | June 14, 1944 |
| 358,088 | France | Jan. 26, 1906 |